United States Patent
Urien (10) Patent No.: US 6,751,671 B1
(45) Date of Patent: Jun. 15, 2004

(54) METHOD OF COMMUNICATION BETWEEN A USER STATION AND A NETWORK, IN PARTICULAR SUCH AS INTERNET, AND IMPLEMENTING ARCHITECTURE

(75) Inventor: Pascal Urien, Villepreux (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/529,380

(22) PCT Filed: Aug. 12, 1999

(86) PCT No.: PCT/FR99/01981
§ 371 (c)(1),
(2), (4) Date: Apr. 13, 2000

(87) PCT Pub. No.: WO00/10139
PCT Pub. Date: Feb. 24, 2000

(30) Foreign Application Priority Data

Aug. 13, 1998 (FR) .............................................. 98 10401

(51) Int. Cl.$^7$ ................................................ G06F 15/16
(52) U.S. Cl. ........................ 709/229; 709/225; 709/227; 709/230
(58) Field of Search ................................. 709/201, 203, 709/229, 230, 225, 227

(56) References Cited

U.S. PATENT DOCUMENTS

| | | | | |
|---|---|---|---|---|
| 5,532,689 A | * | 7/1996 | Bueno .......................... | 340/928 |
| 5,923,884 A | * | 7/1999 | Peyret et al. ................ | 717/167 |
| 5,983,350 A | * | 11/1999 | Minear et al. .............. | 713/201 |
| 6,008,805 A | * | 12/1999 | Land et al. .................. | 345/744 |
| 6,112,305 A | * | 8/2000 | Dancs et al. ................ | 713/156 |
| 6,131,163 A | * | 10/2000 | Wiegel ........................ | 713/201 |
| 6,157,966 A | * | 12/2000 | Montgomery et al. ......... | 710/8 |
| 6,226,744 B1 | * | 5/2001 | Murphy et al. .............. | 713/200 |
| 6,385,729 B1 | * | 5/2002 | DiGiorgio et al. .......... | 713/201 |

FOREIGN PATENT DOCUMENTS

| | | | | |
|---|---|---|---|---|
| WO | WO 97 48210 A | | 12/1997 | |
| WO | WO 97/48210 | * | 12/1997 | .......... H04L/12/46 |
| WO | WO 98 04067 A | | 1/1998 | |
| WO | WO 98 10382 A | | 3/1998 | |
| WO | WO 98 20411 A | | 5/1998 | |
| WO | WO 97/57474 | * | 12/1998 | .......... H04L/29/06 |

* cited by examiner

*Primary Examiner*—Saleh Najjar
(74) *Attorney, Agent, or Firm*—Edward J. Kondracki; Miles & Stockbridge P.C.

(57) ABSTRACT

A method and architecture for communication between a terminal (1) and a smart card, said terminal being operatively connected to a smart card reader (3) and a data transmission network (RI). The terminal includes an initial stack of network (RI) access protocol which consists of a specified number of communication software layers ($C_1$–$C_4$). The said smart card (3) and said smart card reader comprise second and third protocol stacks, each consisting of at least lower order software communication layers ($CC_2$–$CC_1$, $CCa_2$–$CCa_1$), in order to allow data exchange between the smart card and said terminal (1). In a first preliminary phase, a first specific software item (23a) smart card (2a) functions as an interface for the lower layers ($CCa_2$–$CCa_1$) of the third protocol stack and with at least one application (24a) registered in the smart card (2a). In a second preliminary phase, a second specific software item (13), functions as an interface with said lower layers ($CC_2$–$CC_1$), of the second protocol stack and with specified layers of said first protocol stack ($C_2$, $C_3$), and is installed in the terminal (1). The first and second specific software items (13, and 23a) in addition comprise at least one pair of primary coupled software entities (132, 232a). Each of the entities (132 and 232a) cooperate with each other in order to allow for the establishment of a bi-directional data exchange session between the terminal (1) and said smart card (2a) and/or said data transmission network (RI), so that all or part of said data travels through said smart card (2a). The smart card may supply the terminal (1) with a predetermined virtual model which transforms the smart card (2a) into a server and/or client.

30 Claims, 6 Drawing Sheets

FIG_4

FIG_6B

FIG_7A

FIG_7B

FIG_7C

FIG_7D  FIG_8

METHOD OF COMMUNICATION BETWEEN A USER STATION AND A NETWORK, IN PARTICULAR SUCH AS INTERNET, AND IMPLEMENTING ARCHITECTURE

BACKGROUND OF THE INVENTION

1. Field of the Invention

The present invention relates to a method of communication procedure between a user station and a data transmission network, using an Internet-type protocol.

The inventive procedure pertains in particular to a user station equipped with a "smart" card reader and connected to the aforementioned network.

This invention also relates to the system architecture for implementation of the method.

2. Definitions

Within the scope of this invention, the common meaning of the term "user station" is upheld. The aforementioned station may, in particular, consist of a personal computer using various operating systems such as for example, the WINDOWS or UNIX type (both copyrighted). It may also consist of a dedicated worksation, a portable computer or a card terminal.

Similarly, within the scope of this invention, the term "Internet" encompasses, in addition to the Internet itself, all private business networks or other networks, termed "intra-nets", as well as network extensions, termed "extra-nets".

In the following, without limitation to any kind of applications, the scope will refer to a preferred application of the invention, except when otherwise specified. Thus, a user station, termed simply "Terminal" is equipped with a smart card reader and connected to an Internet-type network, is considered.

An application system, based on a smart card, in general consists of the following main components:

a smart card;

a host system consisting of the aforementioned Terminal;

a communication network, and specifically the Internet, for the preferred application;

an application server connected to the network.

DESCRIPTION OF RELATED ACT

Figure 1:
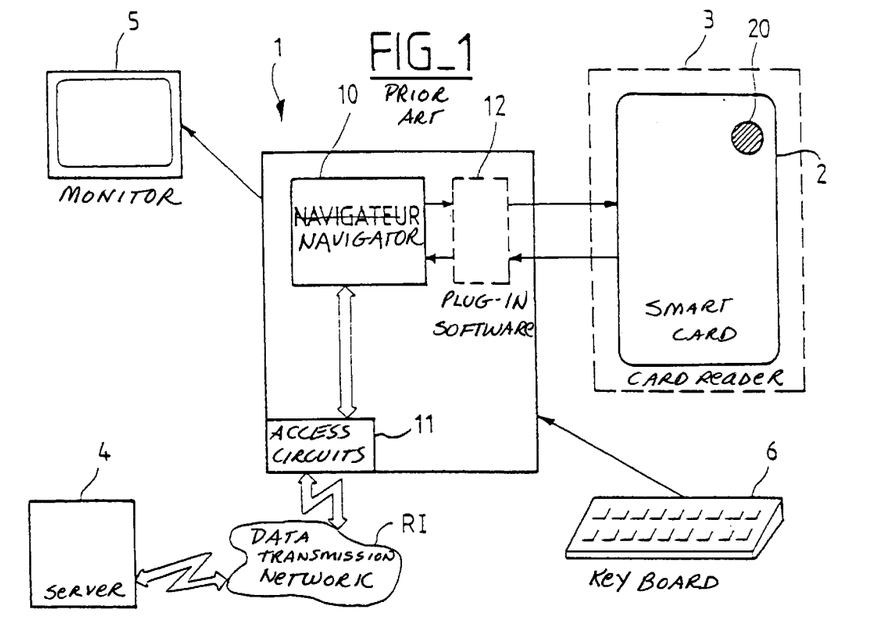
FIG. 1 schematically illustrates an example of system application based on smart cards according to the current state of the art.

FIG. 1 illustrates an example of this type of system architecture. Terminal (1), for example, a personal computer, comprises a smart card (2) reader (3). The reader (3) may or may not be physically integrated to terminal (1). The smart card (2) comprises an integrated circuit (20), the input-output connections of which show through the surface of the case to allow for electrical power supply and communication with the terminal (1). The latter comprises access circuits to a data transmission network (RI). These circuits depend, in particular, on the specificity of network (RI) and terminal (1). On an exemplification basis, it could consist of a network card for local area type networks, or a modem for connection to a dial-up telephone line, or an integrated services digital network (ISDN), for connection to the Internet, for example, via an Internet Service Provider (ISP).

Terminal (1) obviously comprises all the circuits and components required for proper operation, which are omitted for purposes of simplification in the figure. These circuits and components include central unit, read-write and fixed storage memory, magnetic disc memory, disc and/or CD ROM driver, etc.

Additionally, it is also customary for Terminal (1) to be linked to traditional peripherals, integrated or not, such as a monitor (5) and a keyboard (6).

Communication may be established between Terminal (1) and servers connected to the network (RI), one of which (4) is illustrated in FIG. 1. For the case of the preferred application of this invention, access circuits (11) establish communication between terminal (1) and the servers (4) using a particular software (11), termed navigator or "browser". The latter allows for access to different applications distributed across network (RI) and, in general, according to a "client-server" mode.

Usually, network communication occurs according to protocols consistent with specific standards and comprising several superimposed layers of software. For the case of network (RI) of the internet type, communication occurs according to specific protocols compatible with this type of communication, which will be subsequently described in detail, although they also consist of several software layers. A communication protocol is selected depending on the specific application that is targeted: for example querying of "WEB" pages, file transfer, electronic mail (e-mail), forums, "news" etc.

In an application system that is smart card based, as illustrated by the architecture of FIG. 1, the smart card may be ascribed several functions. In particular, it is used for security purposes: confidentiality and/or authentication of the terminal (1) user.

However, it should be noted that card (3) cannot communicate with commercially available navigators unless the latter's code is modified. Current smart cards, which are otherwise consistent with specific standards, contain both software and physical configurations, which also do not allow for direct communication with the Internet. In particular, they cannot receive or transmit data bundles, according to protocols used by this kind of network. Thus, there are provisions for inclusion of an additional piece of software installed in terminal (1), in general, referred to as a "plug-in", according to Anglo-Saxon terminology. This piece of software, referred to in FIG. 1 as (12), functions as an interface between navigator (10) and card (2) and, in particular, the electronic circuits (20) of card (1) therein.

Card (2) supplies data for navigator (10), in particular security data: for example, data that allows identification or authentication, or even data access authorization for any one of the remote servers (4), and/or applications located on the servers.

This procedure affords a greater level of security than usage alone of security software layers, and supplied recently by some navigators. Smart card (2) remains the property of the user and under the user's control. In particular, all security data stays in the smart card (2) memory and is only transmitted to the terminal (1) in numerical format. However, this security chain does present a weak "link". That is, navigator (10) is in communication with the outside world. Thus, in reality, communication is indirect, as it occurs, in particular, via access circuits (11) and via different software layers, which will be described subsequently in greater detail. However, the terminal (1), which is usually used for this type of application, does not include any specific means, whether physical or software, that can afford a high level of security and isolate it from the outside world. Thus, it remains vulnerable to different attacks from network (RI): "viruses", "Trojan horses", "logic bombs" etc., even despite the presence of card reader (3) and smart card (2), peripheral to Terminal (1).

Finally, smart card (2) may be used for applications other than for security. It is important to note that, given the state of the art, the host system linked to the smart card reader (3), that is terminal (1), is also linked to a particular kind of application. In other words, provisions are required for dedicated task specific terminals for each particular application.

Further, there are currently numerous needs for applications based on smart cards, needs that are either imperfectly or completely unsatisfied by the present state of the art, whose main characteristics have been outlined above. Otherwise, there are also certain needs and requirements that are contradictory to these characteristics.

The following list of needs is non-exhaustive:

personal mobility: users need to be able to access communication services anywhere in the world, either using their own equipment or using equipment that is compatible with their smart cards, and thus with a degree of specified communication security;

standard environment: wherever users are, they need to be able to find access to their own work environment, with the benefit of communication security as mentioned above, in other words, the process of changing equipment needs to be "transparent" for users;

terminal mobility: the terminal itself needs to be portable and connectable to any segment of the network, with users benefiting from all possibilities (authorized access, etc.) regularly available at their own sites;

multifunctionality and standardization: Terminals in use should be capable of accepting multi-functional smart cards, which implies that they are no longer required to be dedicated or that they at least require downloading or installing of additional software ("plug-ins" etc.) specific to each application.

SUMMARY OF THE INVENTION

This invention is designed to compensate for disadvantages identified in the state of the art, several of which have been mentioned, while supplying a high level of communication security and responding to needs and requirements that are currently sensed in this domain.

According to one essential characteristic of this invention, all or part of the bi-directional flow of data between terminal and network is generated by the smart card, in order to isolate the terminal from the outside world. For this purpose, at least part of the aforementioned software layers for protocols are installed in the smart card. Additionally, provisions exist for installation of a specific layer of communication software in the smart card, with its counterpart in the terminal. The term "specific" is to be understood as specific to the invention procedure. Thus, these specific communication layers, become all-purpose, regardless of the considered application. They only intervene during the exchange process of bi-directional data between the terminal and the smart card, on the one hand, and between the smart card and the network, on the other.

Specific communication software layers consist, in particular, of software agents, termed "intelligent agents", allowing in particular for protocol conversion. There are agents coupled to specific communication layers, respectively linked to the terminal and the smart card. According to the inventive method, sessions are opened between coupled agents.

Consequently and, in particular, all communication security functions are processed solely from the within the smart card, rather than from within the terminal. The smart card no longer transmits keys or other stored and secret data to the terminal in any form whatsoever, even numerical, according to the state of the art (FIG. 1).

However, according to another feature of this invention, the smart card can authorize direct links between the terminal and, in particular, the navigator, for Internet-type transmissions and the network, for example, for data that requires security processing (graphic or image data of "WEB" pages etc.).

According to another characteristic of this invention, the smart card supplies the host system, that is, the terminal, with a virtual terminal, for example, as a page in "HTML" (HyperText Markup Language) or, in general, in hypertext format, or even as a software item termed "applet" in JAVA (Copyrighted) language, which allows the user to select a particular application among those available and offered by the smart card. Thus, the terminal becomes all-purpose as it supports numerous applications. The host system is seen as peripheral to the smart card, supplying physical resources such as a monitor for visualization, a keyboard, etc.

This invention thus relates to a method of communication between a terminal, equipped with a smart card reader and a data transmission network, said terminal containing an initial protocol access stack to the network, which consists of a specific number of communication software layers, and said smart card reader, said smart card comprising second and third protocol stacks, each consisting of at least communication software layers, termed lower, in order to allow data exchange between the smart card and said terminal, wherein it comprises an initial and preliminary phase for installing, on the smart card, a specific software item, which functions as an interface between said lower layers of the third protocol stack and at least one registered application of the smart card, wherein it comprises a second preliminary phase for installing a specific software item, which functions as an interface between said lower layers of the second protocol stack and specific layers of said initial protocol stack, wherein said first and second specific software items additionally consist of at least one pair of initially coupled software entities, each of said entities cooperating with the other in order to allow for a bi-directional data exchange session to be opened between said terminal and said smart card and/or the network, so that all or part of said data travels through said smart card.

This invention also relates to a method of communication between a terminal equipped with smart card reader and a data transmission network, said terminal comprising an initial protocol access stack to the network, which consists of a specific number of communication software layers, and said smart card reader, said smart card consisting of the second and third access protocol stacks, each consisting of at least software communication layers, termed lower, in order to allow data exchange between the smart card and said terminal, wherein it consists of an initial preliminary phase to install, on the smart card, an initial specific software item, which functions as an interface between said lower layers of the third protocol stack and at least one registered application of the smart card, wherein it consists of a second preliminary phase to install on the terminal a second specific software item, which functions as an interface between said lower layers and the second protocol stack and with specific layers of said first protocol stack, wherein said first and second specific software items additionally consist of at least one pair of initially coupled software entities, each of which entities cooperating with the other in order to allow for a session of bi-directional data exchange to be opened between said terminal and said smart card, so that said smart card supplies said terminal with a model terminal, termed virtual, that transforms the smart card into a server and/or client.

This invention additionally relates to system architecture for the implementation of the procedure.

It is easy to observe that this invention clearly offers numerous advantages. It offers, in particular, high level of security for communication between terminal and network. It creates an all-purpose terminal, which allows it to support numerous applications without having to modify either physical components of the terminal or any of the applications running inside the terminal. All that is required is to install a specific communication software layer, which may be performed once permanently or via uploading, as many times as required from different sources: diskettes, CD-ROMs, downloading etc. It remains completely compatible with existing equipment and its implementation. As an example, when a user does not want to benefit from the possibilities and advantages of this invention, or if she/he does not own a smart card consistent with this invention, it is still possible to use the terminal and associated navigator, as well as a traditional smart card, in a conventional manner, that is, as described in reference to the system in FIG. 1.

BRIEF DESCRIPTION OF THE DRAWINGS

This invention will be better understood and other characteristics and advantages with become clear following the description below, in reference to the appendix Figures, among which.

DETAILED DESCRIPTION OF THE PREFERRED EMBODIMENTS

Prior to describing the method of communication of this invention and providing a detailed description of the architecture for implementation, it appears of interest to briefly summarize the main features of existing communication protocols for networks.

The architecture of communication networks is described in terms of various layers. As an example, the "OSI ("Open System Interconnection") standard consists of seven layers ranging from layers, termed lower (for example the layer termed "physical" which pertains to support for physical transmissions), to layers, termed higher (for example the layer termed "application layer") and intermediate layers, in particular, the layer termed "transport layer". Any given layer offers services to a layer that immediately succeeds it and requires from the preceding layer other kinds of services, via an appropriate set of interfaces. Layers communicate with each other using primitives. They can also communicate with layers on an intra-level basis. In certain architectures, one layer or another may be missing.

In the Internet environment, there are five layers and, in particular, from the highest layer to the lowest: an application layer ("http", "ftp", "e-mail" etc.), a transport layer ("TCP"), a network addressing layer ("IP"), a data link layer ("PPP", "SLIP", etc.) and the physical layer.

Following this brief outline, we now proceed to the description of an application system architecture, based on an inventive smart card. An example of such an architecture is represented schematically in FIG. 1. Elements common to FIG. 1 are referred to in identical ways and are not described anew, except when required. To simplify the Figure, various peripherals connected to the terminal have been omitted (for example, from FIG. 1, both the monitor (5) and keyboard (6) have been omitted). It should clearly appear that the invention requires no physical modifications of Terminal (1), nor of any of the applications related to it. The only required modifications are specified in the following.

According to an initial and important characteristic of this invention, all or part of the flow of data between Terminal (1) and the network (RI) travels through the smart card, henceforth referred to as (2a). The flow of data however continues to travel through access circuits to network (11). As previously explained, given the state of the art, smart cards cannot be directly connected to a network, and in particular of the type Internet.

Access circuits (11) are connected to smart card (2a) via a bi-directional transmission channel, represented by two serial links (21a). Similarly, smart card (2a) is connected to the terminal and, in particular, navigator (10) via a bi-directional transmission channel, which is represented by two serial links (22a).

More specifically, channel (21a) and channel (22a) are disjointed and bi-directional from a logical point of view. Specific software layers (13) and (23a), which will be described in detail later, allow, in particular, using a unique physical connection, of the type termed "half-duplex" according to current state of the art, two analog channels, (21a) and (22a) to be obtained.

To obtain such a function, smart card (2a) is specific to the invention. This specificity does not pertain to physical structure, at least not to the external configuration of the card and the chip (not shown in FIG. 2). Location of the latter depends on a series of norms as well as physical interfaces (input-output meters, etc.) and electrical constraints (type of signal etc.).

Figure 2:
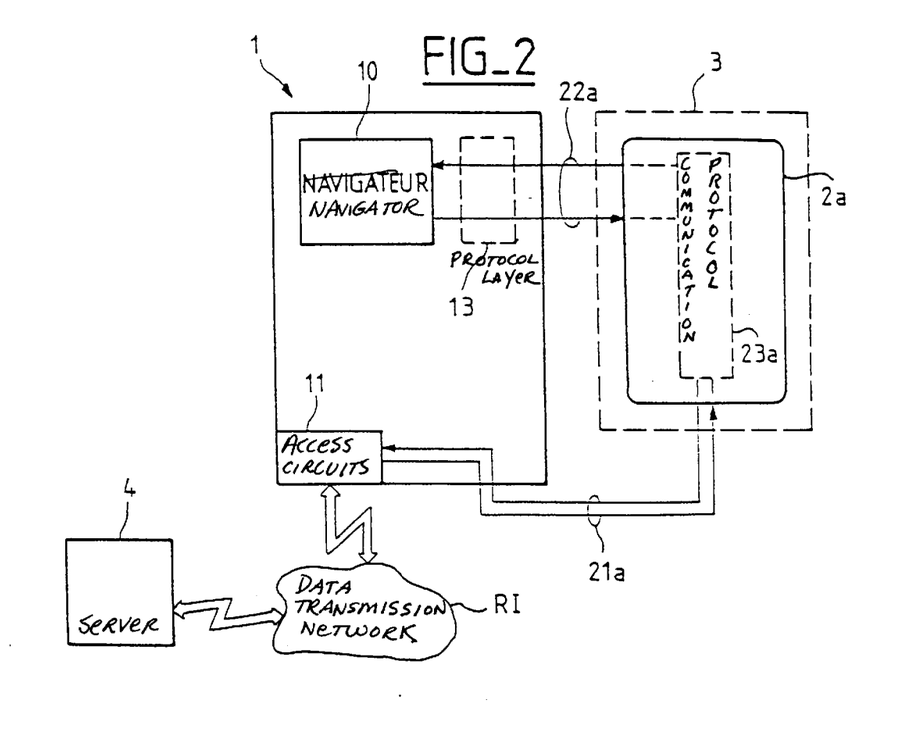
FIG. 2 schematically illustrates an example of a system application based on smart cards according to an initial feature of this invention.

However, as will be demonstrated later in greater detail, numerous applications (not shown) can be installed on smart card (2a). Additionally, a layer of specific communication protocol needs to be installed, which is represented in FIG. 2 by (23a).

In a symmetrical way, on Terminal (1), provisions are required for installation of a layer of specific protocol, schematically represented as (13), functioning as a counterpart to the specific layer instance of smart card (2a).

The architecture that has been outlined above allows, in particular, to process all functions linked to communication security from within smart card (2a): authentication, etc.

Data remains secret and confined to the smart card (2a) circuits and are thus no longer sent to terminal (1).

According to another important characteristic of this invention, smart card (2a), supplies the host system, that is, Terminal (1), with a virtual model. For this purpose, according to a preferred application, smart card (2a) functions as a "WEB" server.

Smart card (2a) is "addressed" by navigator (10). It sends a "WEB" type page in "HTML", an "applet" or any other kind of software item. As an example, the "WEB" page may be displayed as a home page supplying various application options and/or hyperlinks to outside servers.

In practice, smart card (2a) is advantageously "addressed" by a "URL" (Universal Resource Location) address, which feeds back to Terminal (1) itself, rather than pointing to an outside server. As an example, the structure of a "URL" usually is as follows:

$$\text{http://127.0.0.1:8080} \qquad [1]$$

wherein 127.0.0.1 corresponds to the feedback "IP" address and 8080 corresponds to port identification.

Figure 3A:
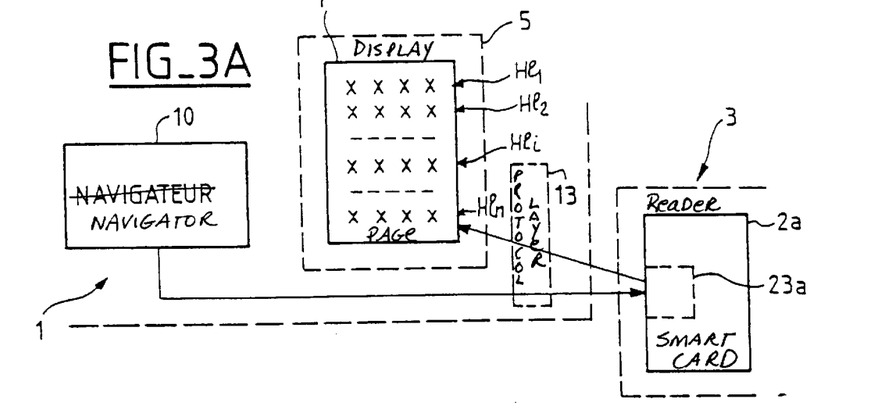
FIGS. 3A–3C schematically illustrate additional aspects of this invention.

FIG. 3A schematically illustrates this procedure. On a hypothetical basis, in response to a query by navigator (10), smart card (2a) displays a page P in "HTML", a page displayed, for example, on visualization component (5) of Terminal (1). Page P, defined as a home page, may display, as customary, various graphic or text elements, but also comprises several hyperlinks to outside servers, $Hl_1$, $Hl_2$, . . . , $Hl_j$ to $Hl_n$, where "j" and "n" are arbitrary numbers and "n" represents the maximum number of possible choices. It is obviously dependent upon smart card (2a) being inserted in reader (3). Choices offered may depend on those rights, which have been granted to the smart card (2a) user: subscription to services, level of access, etc. The procedure, which is described, uses part or all of standard communication layers (not shown), as well as specific layers (13) and (23a), in a way that will be specified in detail later.

Figures 3B, 3C:
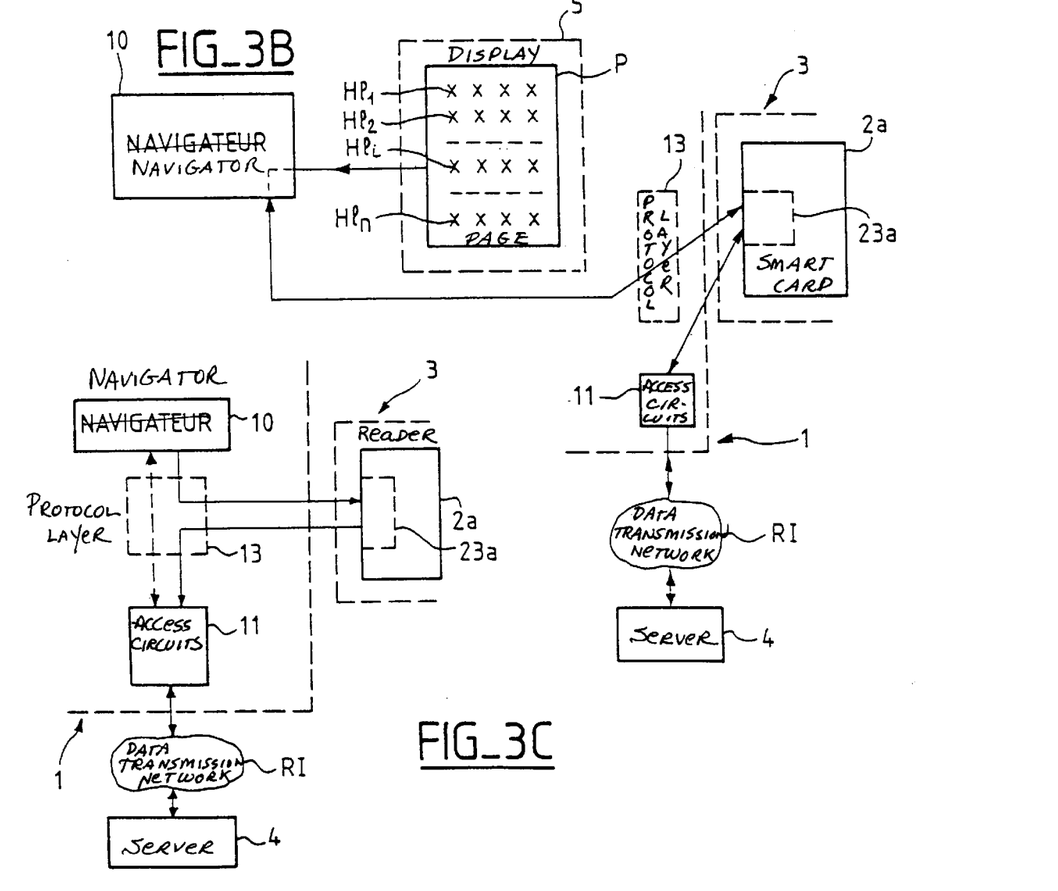

Each hyperlink, for example hyperlink $Hl_j$, points to an outside "URL" resource. This communication and data exchange procedure between Terminal (1) and a server (4), connected to network (RI) and comprising the resource addressed by the "URL" associated to hyperlink $Hl_j$, has been illustrated in FIG. 3B. As an example, the "URL" structure may appear as follows:

$$\text{http://127.0.0.1:8081/www.NAME.com/index.html} \qquad [2]$$

wherein 127.0.0.1 corresponds to the "IP" address, 8081 corresponds to port identification, "NAME.com" corresponds to the an Internet company or other kind of site, according to customary rules for naming such sites, and "index.html" corresponds to the home page of the site in question. Instead, and in lieu of the extension ".com" customary for commercial-type organizations, there are other extensions, such as ".fr" or ".gov", which correspond to the location of the site on the Internet or to the type of organization.

The flow of data between Terminal (1) and addressed server (4) travels though smart card (2a) and access circuits (11) to the network (RI) (for example, a modem). Smart card (2a) processes, in particular, all problems, which are linked to security of communication: authentication, data verification and filtering, etc. As previously mentioned, both standard communication protocols and specific communication protocols (13, and 23a) are used.

According to another aspect of this invention, smart card (2a) is capable of authorizing direct data exchange between navigator (10) or, in general, between Terminal (1) and network (RI) and the addressed server (4). This procedure is illustrated schematically in FIG. 3C. Obviously, all data exchange occurs via access circuits (11) to network (RI). Concerned data advantageously corresponds to data that has no impact on security, such as page backgrounds, icons, etc., or text that is "nonsensitive" or non-confidential.

It follows from those specific features of this invention, outlined above, that Terminal (1) becomes all-purpose and supports numerous applications. Additionally, when certain applications require a particular communication protocol, smart card (2a) can supply Terminal (1) with programs, in "JAVA' script format, for example, which provide instructions for use.

Figure 4:
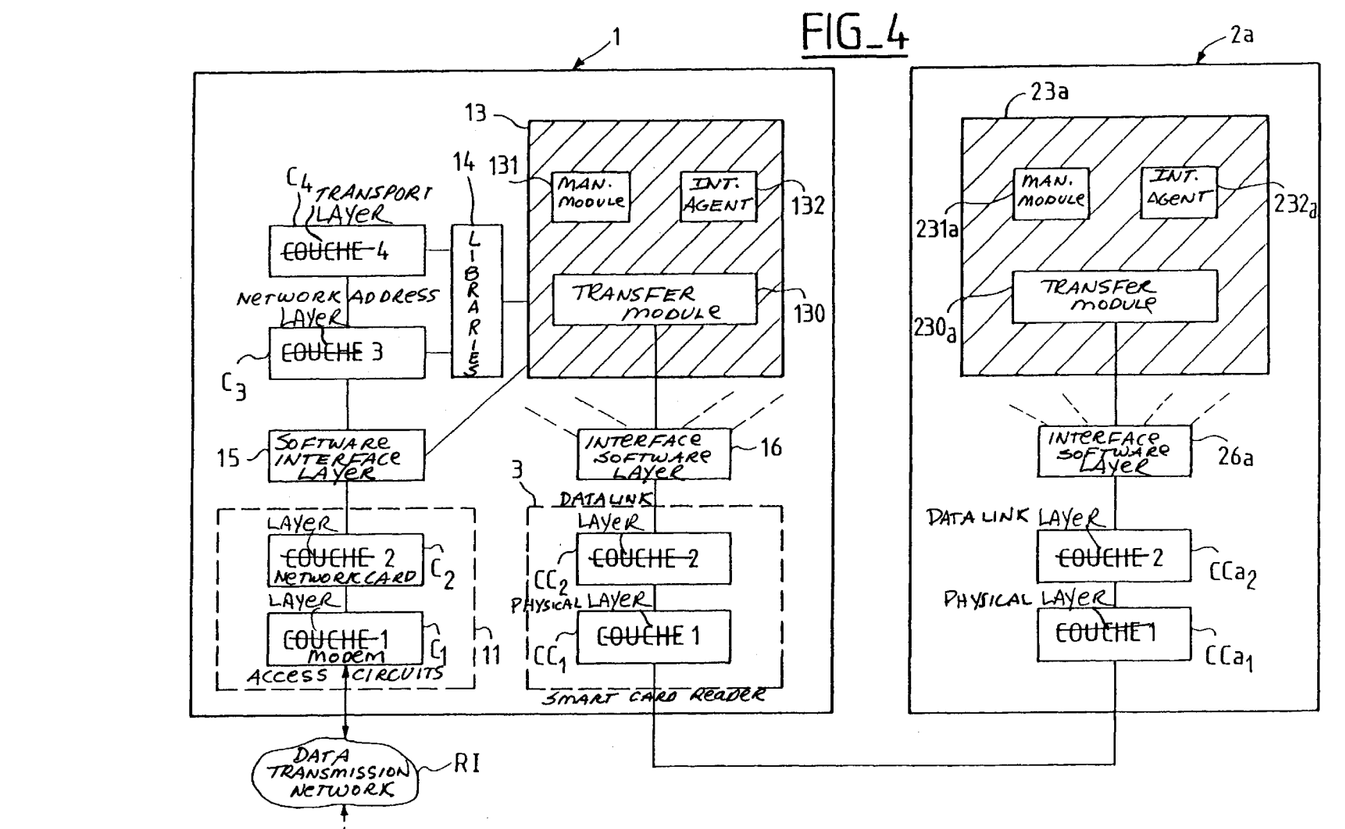
FIG. 4 schematically illustrates the complete architecture of a terminal equipped with a smart card reader, according to this invention.

In the following, in accordance with FIG. 4, a more detailed description of a sample architecture for application based on the smart card of this invention is provided.

With the exception of communication protocol software layers (13) and (23a), which are specific to this invention, each installed in Terminal (1), and smart card (2a), the other components, physical or software, are all well known to the state of the art.

Terminal (1) comprises access circuits (11) to network (RI) consisting, for example, of a modem for Internet access or a network card for local network access. These circuits group lower software layers $C_1$ and $C_2$ corresponding to previously mentioned "physical" and "data links" layers.

Higher layers $C_3$ and $C_4$ have also been represented corresponding to "network addressing" ("IP" for the case of the Internet) and "transport" ("TCP"). The higher application layer ("http", "ftp", "e-mail", etc.) has not been represented.

Interface between lower layers $C_1$ and $C_2$ and higher layers $C_3$ and $C_4$ consists of a software layer (15), generally referred to as "lower layer driver". Higher layers, $C_3$ and $C_4$, rely on this interface and are implemented via libraries of specific functions and network libraries (14), to which they each correspond. For the case of the Internet, "TCP/IP" is implemented via libraries, termed "sockets".

In FIG. 2, this organization allows navigator (10) to send queries to server (4) for consultation of "WEB" pages (protocol "HTTP"), for the transfer of files (protocol "FTP") or for sending electronic mail (protocol "e-mail").

Terminal (1) also comprises smart card reader (3), integrated or not. To communicate with smart card (2a), the card reader also encompasses lower layers $CC_1$ (physical layer) and $CC_2$ (data link layer), which function in ways similar to layer C1 and layer $C_2$. Software interfaces between layer $CC_1$ and layer $CC_2$ are described, for example, via specification "PC/SC" ("part 6, service provider"). As for layer $CC_1$ and layer $CC_2$, these are specifically described in ISO norms 7816-1 to 7816-4.

According to the state of the art (and also in this invention), an additional software layer (16) constitutes the interface between application layers (not shown) and lower layers $CC_1$ and $CC_2$. The main function delegated to this layer consists of multiplexing/demultiplexing functions.

Communication with smart card (2a) occurs according to a paradigm that is similar to that which is used for the manipulation of files in a "UNIX" (Copyrighted) type operating system: OPEN, READ, WRITE, CLOSE etc.

A similar organization exists for smart card (2a), that is, the presence of two lower layers $CCa_1$ (physical layer) and $CCa_2$ (data link layer), as well as an interface layer (26a), quite similar to layer (16).

According to an important primary characteristic of this invention, provisions exist on both sides, that is, within terminal (1) and within smart card (2a), for installation of specific communication protocol layers: (13) and (23a) respectively.

In Terminal (1), layer (13) interfaces with "lower driver layers" (15) with libraries (14) of network layers $C_3$ and $C_4$ and with protocol layers of card reader (3), that is, with lower layers $CC_1$ and $CC_2$, via multiplexing layer (16). Layer (13) allows the transfer of network bundles to and from smart card (2a). Additionally, it adapts to existing applications, such as the Internet navigator (10) (FIG. 2), electronic mail, etc, for uses that invoke function of smart card (2a).

A perfectly similar organization exists for smart card (2a) consisting of an additional implementation of the specific layer (23a) in counterpart to layer (13).

More particularly, specific layers, (13) and (23a) have been subdivided into three main software components:

- a module, (130) or (230a), for the transfer of information blocks between layers (13) and (23a) via layers $CC_1$, $CC_2$, $CCa_1$ and $CCa_2$;
- one or several software items (132) and (232a), termed "intelligent agents", which perform, for example, functions for protocol conversion and
- one module for the management of a specific configuration, (131) and (231a) respectively, a module that may be assimilated by a particular intelligent agent.

Figure 5:
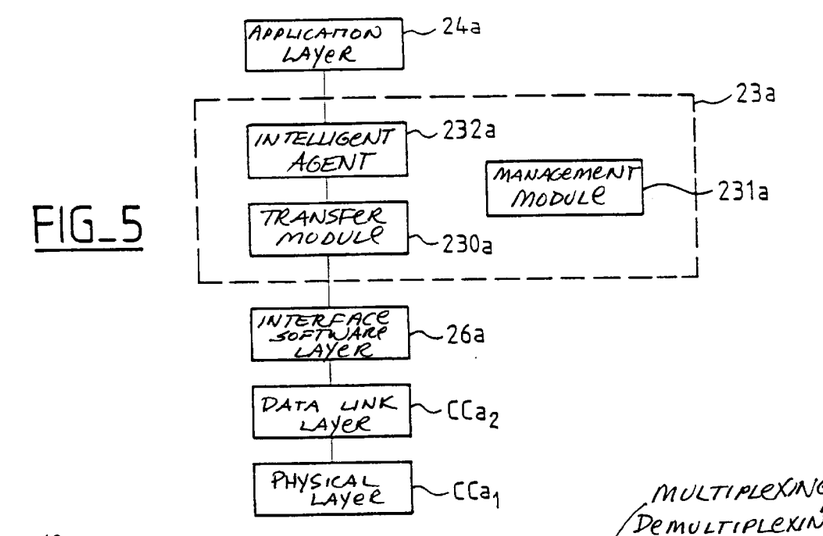
FIG. 5 schematically illustrates a protocol stack for communication layers, according to this invention.

Thus, there exists, within Terminal (1) and within smart card (2a) a stack of communication protocols functioning between both entities. FIG. 5 illustrates the communication protocol stack of smart card (2a), given that the communication protocol stack for Terminal (1) presents a similar structure.

Moving from lower to higher layers, there are layers $CCa_1$, $CCa_2$, 26a, 230a, 231a, 232a, previously mentioned, as well as an application-level layer (24a). It should be noted that smart card (2a) can support several different applications.

Level 2 layers (data link layers) $CC_2$ and $CCa_2$ support exchanges between smart card (2a) and Terminal (1). These layers are responsible for detection and eventual correction of transmission errors. Different protocol options exist and the following, in particular, on a non-exhaustive basis:

- recommendation ETSI GSM 11.11;
- the protocol established by norm ISO 7816-3, in T=0 character mode;
- the protocol established by norm ISO 7816-3, in T=1 block mode or
- the protocol established by norm ISO 3309, in "HDLC" frame mode (meaning "High-Level Data Link Control procedure".)

Within the framework of this invention, the preferred protocol corresponds to ISO 7816-3, in block mode.

According to established methods, for each protocol layer there exist several primitives that allow for the exchange of data between layers located at the same level and between each layer. As an example, primitives associated to level 2 layers are of the type "data-request" ("Data.request") and "data-response" (Data.response) from the smart card, as well as "data-confirmation" ("Data.confirm"), etc.

More specifically, according to this invention, layers (13) and (23a) are in charge of the dialogue between smart card (2a) and the host, that is, Terminal (1). These layers thus allow for exchange of information between terminal (1) users (not shown) and smart card (2a), for example, via scrolling hypertext menus in "HTML", as demonstrated for FIGS. 3A and 3B (for page P). These also allow a configuration to be set up that is adapted to sending/receiving data bundles.

As indicated above, these layers comprise three distinct entities.

The first layer (130) or (230) essentially consists of a logic multiplexer. It allows for exchange of information between smart card (2a) and host terminal (1), occurring as protocol data units. It functions in a way that is similar to a data bundle switch. These units are sent or received via level 2 layers (data link layers). This particular communication protocol allows communication to be established between at least one pair of "intelligent agents". The first agent (132) of each pair is located in layer (13) on the side of terminal (1); the second (232a) is located in layer (23a) on the side of smart card (2a). A link between two "intelligent agents" is associated to each session. A session is defined as an exchange of bi-directional data between these two agents.

An intelligent agent is capable of performing all or part of layer functions at level 3 and 4, depending on the design configuration of Terminal (1).

A particular intelligent agent is advantageously identified by an integer, for example, out of 16 bits (an integer ranging between 0 and 65535). This identification marker is used, for example, in a data protocol unit as a destination or source reference.

There are two major categories of intelligent agents: "server" type agents, which are identified with a fixed reference and "client" type agents, which are identified with a variable type reference, which is supplied by a specific layer (130) or (230a).

The procedure required to open a session usually is the following: an intelligent agent of the type "client" opens a session towards an intelligent agent of the type "server". Layers (130) and (230a) manage the tables (not shown), which contain a list of those intelligent agents that are present on both the terminal (1) host and smart card (2a) sides.

Intelligent agents are associated with a particular set of properties or attributes. On a non-exhaustive, exemplification basis, the following six properties are listed in association with intelligent agents:

- "host": agent located in the terminal;
- "card": agent located in the smart card;
- "local": agent that does not communicate with the network;
- "network": agent that communicates with the network;
- "client": agent that initializes a session;
- "server": agent that receives a session request.

For the case of the Internet, the main application targeted by this invention, client/server agents on the smart card side, perform client and/or server protocols, which are described by a set of control specifications, known in Anglo-Saxon terminology as "RFC" ("Reserved for Command"). As a non-exhaustive example, protocol "HTTP 1.1" corresponds to specification "RFC 2068".

Intelligent agents allow for the exchange of data (in hypertext, for example), however, they are also capable of launching network transactions.

Configuration management modules (131) and (232a) respectively correspond to particular intelligent agents. For example, module (131), on the side of host Terminal (1), manages, in particular, all information relative to the configuration of the terminal (functioning modes, as will be specified in greater detail for FIGS. 7A to 7D), lists of agents that are present, etc. Module (231a), on the side of smart card (2a), comprises similar functions. Communication between both of these agents may be established in order to open a session.

Figure 6A:
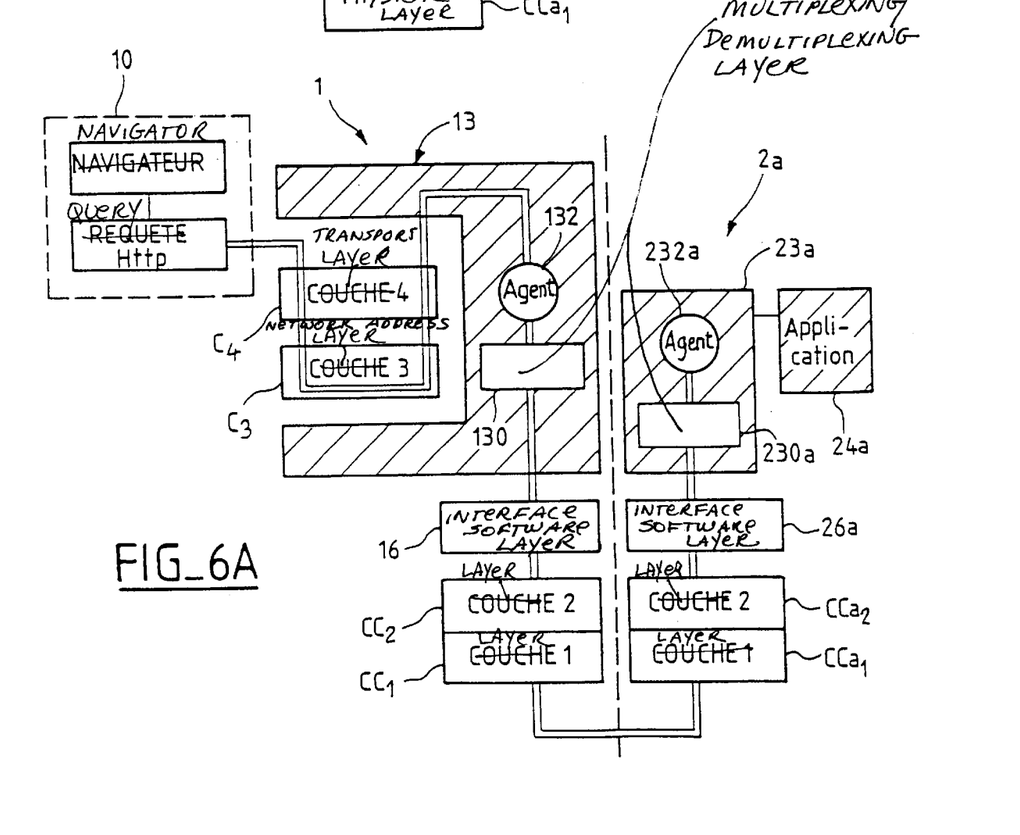
FIGS. 6A and 6B schematically illustrate two examples of data exchange between a smart card, a terminal of FIG. 5 and an outside network.
Figure 6B:
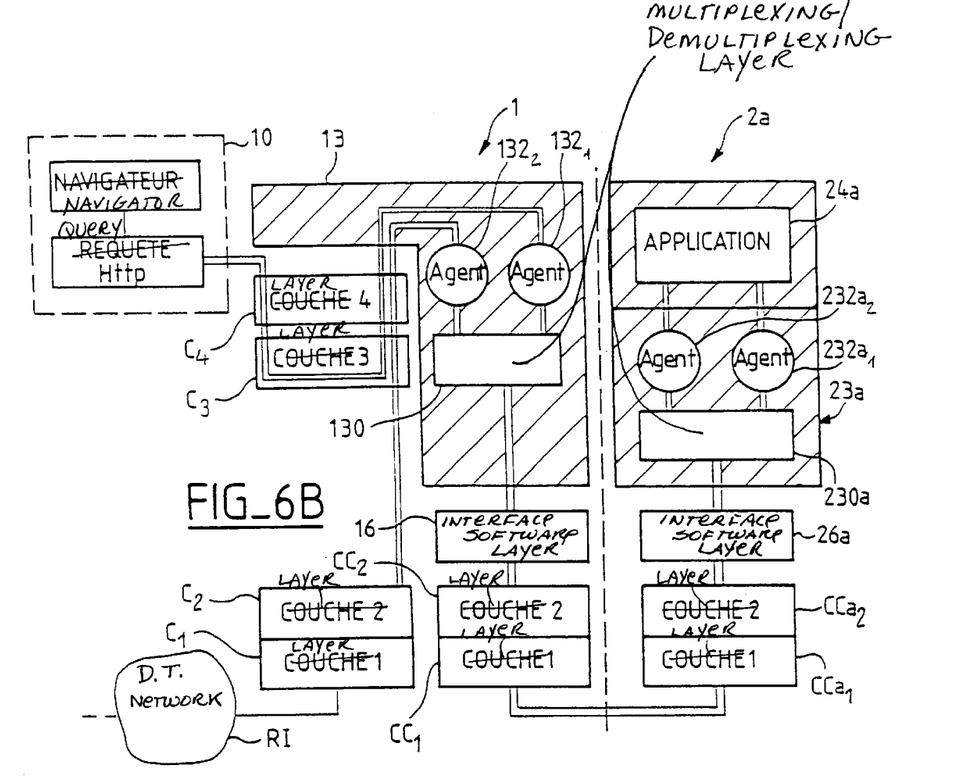

Two examples corresponding to these procedures and in reference to FIGS. 6A and 6B are described in the following.

FIG. 6A illustrates in box diagram format the architecture that corresponds to presentation of a virtual terminal to host terminal (1). This Figure outlines in detail the procedure that has been previously described in reference to FIG. 3A. Elements, which are common to the preceding Figures, display identical references and are described anew only as required.

The procedure, which is described, requires correspondence only between a single pair of intelligent agents (132) and (232a).

As previously mentioned, "WEB" navigator (10) present Terminal (1) sends an "HTTP" query implying feedback on itself (see formula [1]). The query is sent to layer $C_4$ ("TCP" transport layer), then to layer $C_3$ ("IP" network address layer). As the "URL" implies "IP" feedback addressing, the query is sent back to layer $C_4$, which forwards it to a specific layer corresponding to intelligent agent (132). The latter opens a session with its counterpart in smart card (2a), that is, with intelligent agent (232a). It converts the "URL" into a format that is acceptable by layers (130) and (230a). The exchange bi-directional data then occurs via different stack layers: 130, 16, $CC_2$, and $CC_1$ for Terminal (1), and $CCa_1$, $CCa_2$, 26a, and 230a for smart card (2a).

In response, intelligent agent (232a) sends instructions and/or data contained in application layer (24a). The latter, as previously mentioned, may appear as scrolling "WEB" page menus or in "HTML" format (FIG. 3A: P).

However, an "HTTP" connection with network (RI) implies cooperation between two pairs of intelligent agents. FIG. 6B illustrates schematically such a procedure in box diagram format. Elements, which are common to preceding Figures, display identical references and are described anew only as required.

The "URL" sent by the navigator is of the type previously described in formula [2].

On the side of Terminal (1), an initial intelligent agent (1321) with "local"-type properties ensures exchanges between host Terminal (1) and an agent ($232a_1$), located on smart card (2a), also bearing "local" type properties.

Similarly, a second intelligent agent ($132_2$) with "network"-type properties ensures exchanges between an agent ($232a_2$), located on smart card (2a), also bearing "network" type properties, and network (RI).

This connection establishes two sessions:

1/ host agent local $132_1$ ⇔ card agent local $232a_1$;

2/ host agent network $132_2$ ⇔ Chard agent network $232a_2$.

Layers (130) and (230a) guarantee, in particular, all software multiplexing/demultiplexing functions, in order to direct data from and to agents ($132_1$) and ($232a_1$), on the one hand, and from and to agents ($132_2$) and ($232a_2$), on the other.

For the first session, the flow of data travels through Terminal (1) layers: $C_4$, $C_3$, $C_4$, 13 (agent $132_1$ and layer 130), 16, $CC_2$ and $CC_1$, and smart card (2a) layers: $CCa_1$, $CCa_2$, 23a, (layer 230a and agent $232a_1$), to reach application layer (24a).

For the second session, the flow of data, originating from application layer (24a), travels through smart card (2a) layers: 23a, (agent $232a_2$, and layer 230a), 26a, $CCa_2$, $CCa_1$, and Terminal (1) layers: $CC_1$, $CC_2$, 16, 13, (agent $132_2$, and layer 130), $C_4$ to $C_1$, prior to reaching network RI.

Several configuration examples, in accordance with FIGS. 7A to 7D, will henceforth be described in the following. Depending on both the particular type of network considered and the terminal, the partition of communication software layers can occur differentially. Elements, which are common to both these Figures and the preceding ones, are displayed with identical references and are described anew only as required.

Figure 7A:
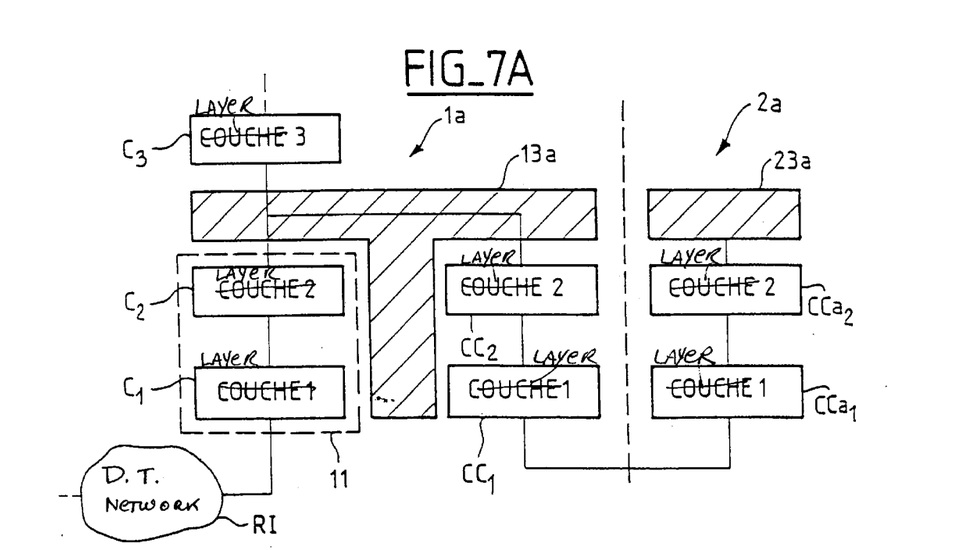
FIGS. 7A to 7D schematically illustrate, in box diagram format, various different system architectures, consistent with this invention.
Figure 7B:
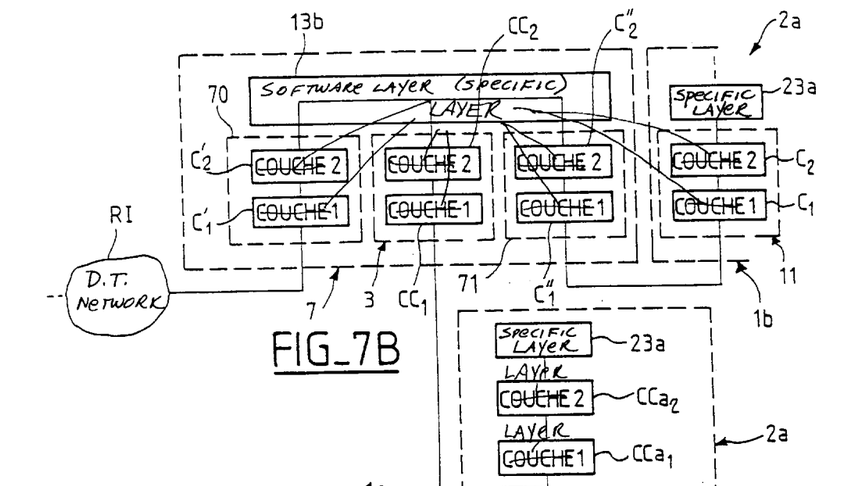

FIGS. 7A and 7B illustrate schematically, in box diagram format, two architectures that are more specifically adapted to a mode, termed "network partition". According to this mode, the smart card and the terminal share the same address, for example, the same "IP" address, when network RI is of the type Internet. The final addressee of network data bundles is determined according to criteria that have been pre-established.

FIG. 7A illustrates schematically an architecture with software partition of one network layer. The Terminal (1a) contains a network layer $C_3$ (network addressing layer). Smart card (2a) receives network bundles addressed to the Terminal according to a set of specific parameters (sender address, etc.). Bundles are sent with the network address of Terminal (1a). As previously outlined, provisions exist for installation of two specific layers (13a) and (23a), located in Terminal (1a) and smart card (2a) respectively. Layers (16) and (26a) (in FIGS. 6A and 6B) have not been represented.

FIG. 7B illustrates schematically an architecture with physical partition of a network layer. A physical device (7) is inserted between network (RI) and the (1b). Device (7) permits receiving network bundles addressed to terminal (1b), depending on a set of specific parameters (sender address etc.). Bundles are sent with the network address of terminal (1b). The physical device comprises, for example, two communication circuits, for example, of the type network cards (70) and (71), each consisting of two lower communication protocol layers $C'_1-C'_2$ and $C''_1-C''_2$ respectively. The card or circuits (70) are linked to network (RI). The card, or circuits (71) are linked to network access circuits (11) or, in general, to the communication card, which is present in terminal (1b). Communication between network (RI) and Terminal (1b) thus occurs via physical device (7), incorporating specific layer (13b).

Physical device (7) is additionally connected to reader sub-system (3), integrated or not, for smart card (2a). This reader sub-system comprises, as previously mentioned, layers $CC_1$ and $CC_2$. Similarly, smart card (2a) contains two lower layers $CCa_1$ and $CCa_2$ as well as specific layer (23a).

Figure 7C:
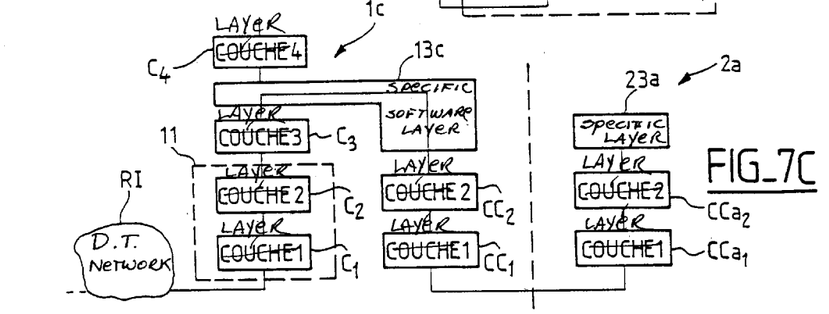

FIG. 7C schematically illustrates, in box diagram format, an architecture that is more specifically adapted to a functioning mode termed "bridge".

According to this functioning mode, smart card (2a) contains an individual network address. The Terminal, (1c) functions as an access bridge from smart card (2a) to network (RI). Specific layer (13c), on the side of the terminal, is located between layer $C_3$ (network addressing layer) and layer $CC_2$. As previously outlined, smart card (2a) comprises specific layer (23a), the counterpart to layer (13c).

Figure 7D:
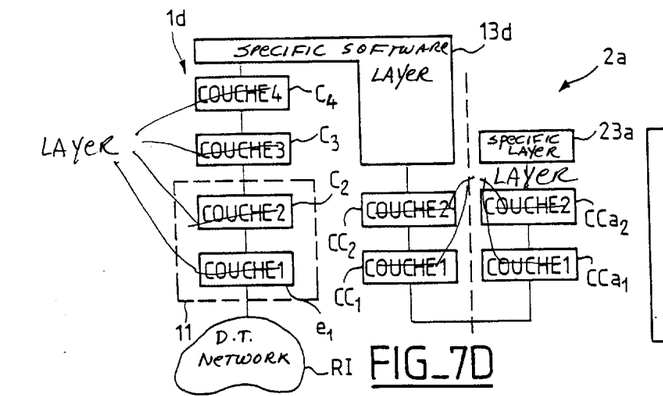

FIG. 7D illustrates schematically, in box diagram format, an architecture that is more specifically adapted to a functioning mode termed "tunnel".

According to this functioning mode, the terminal (1d) cannot supply or share a level 3 layer. The only possible method of communication between smart card (2a) and network (RI) consists in establishing a "tunnel" where application data can travel and which is eventually translated by a protocol converter in the specific layer on the terminal side (13d). Specific layer (13d) is located between layers at level 4 (C₄) and an application layer (not shown). As previously outlined, smart card (2a) comprises a specific layer (23a), the counterpart to layer (13d).

Characteristics of the terminal and/or possible configurations may be identified by the smart card or conversely controlled by the latter using primitives.

On a non-exhaustive, exemplification basis, an initial primitive, defined as:

"TerminalGetConfiguration.request", (to obtain the configuration) and sent by the smart card to the terminal, allows the request of characteristics of the terminal, as well as all various possible configurations. The response to this query is obtained in a dual primitive:

"TerminalGetConfiguration.response".

A second primitive, defined as:

"TerminalSetConfiguration.request", (control configuration) and sent by the smart card to the terminal, allows configuration of the terminal. The response to this command, traveling as a dual primitive:

"TerminalSetConfiguration.response", allows all information required for network transactions (network address, configuration, etc.) to be obtained.

When a configuration is available, the smart card can send or receive data, from and to network (RI). The data, which is exchanged between the smart card and the terminal, consists of network bundles where the terminal offers such a possibility, or application data where the tunnel mode has been implemented (FIG. 7D).

Available applications on the host system of the smart card are capable of communicating with the smart card using protocol converters. This function is delegated to intelligent agents located in the specific layers of the communication protocol.

On the terminal side, methods of communication between applications and intelligent agents may vary depending on the type of terminal and, in particular, the type of operating system in use. On a non-exhaustive, exemplification basis, the following are listed:

"API"s ("Application Programmatic Interface");

"DLL"s ("Dynamic Link Library");

use of a feedback address, such as the aforementioned "URL" [1].

Figure 8:
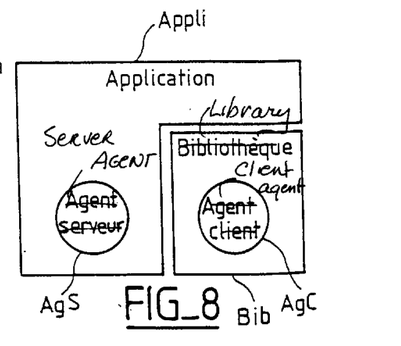
FIG. 8 schematically illustrates a particular software configuration for the smart card.

Finally, as illustrated schematically in FIG. 8, an intelligent agent AgS, termed server, may be integrated in an application Appli located in the smart card. In this case, the associated reference identifies application Appli. For example, use of an intelligent agent Agc, termed client, stored in a library Bib, is possible via an "API". In such a configuration, the server stores the keys and uses the services of the client who knows the required communication protocol.

To summarize the preceding, a more detailed description is provided in the following of the major steps invoked in the example of a complete implementation:

1/ the smart card is inserted in the smart card reader connected to the host terminal;

2/ the host terminal sends what is termed an acknowledgment token;

3/ the smart card receives terminal configuration via the aforementioned primitive:

"TerminalGetConfiguration.request"

and, depending on the response, the smart card either initiates a dialogue or, conversely, waits for a terminal query;

4/ the terminal receives an index of all functions present in the smart card via a feedback "URL": http://127.0.0.1:8080/index.html (see [1]), for a session of the type:

"HTTP ⇔ Local Host Intelligent Agent Client ⇔ specific layer 130 ⇔ specific layer 230 ⇔ Local Card Intelligent Agent Server".

5/ upon receipt, the user of the terminal selects one of the available applications;

6/ the user decides to connect to an outside server for which the smart card supplies access;

7/ the navigator generates a "URL", for example:

http://127.0.0.1:8080/www.NAME.com/index.html (see [2]), sent to the smart card, via a protocol converter, in a session of the type:

"HTTP ⇔ Local Host Intelligent Agent Client ⇔ specific layer 130 ⇔ specific layer 230 ⇔ Local Card Intelligent Agent Server"

8/ an invitation to enter a password then appears, using a session between two intelligent agents for data exchange, following which the password is sent to the smart card;

9/ the smart card verifies the validity of the password supplied during the preceding step, using security data stored within it;

10/ a specific configuration is defined for the terminal, and is applied using the aforementioned primitive "TerminalSetConfiguration.request";

11/ the smart card connects to the selected application server, according to the specifications of the application;

12/ the user receives in response to his/her request (of the type "HTTP") an acknowledgment or a file depending on the type of service that is implemented.

Following consideration of the above, it appears that the invention clearly achieves that which it set out to accomplish.

As previously mentioned, it presents numerous advantages and, in particular, the following: a high degree of security for communication occurring between the terminal and a network; all-purpose function of the terminal, which allows for support of numerous applications, without requiring any modification of the physical parts of the terminal or of the applications running within it. All that is required is installation of a specific layer of communication software. It remains entirely compatible with existing equipment and its implementation. It permits high user mobility and/or of the user terminal while retaining all communication security levels previously mentioned. Finally, it offers high comfort levels, since users can, on any machine that accepts their smart card, find their own personal and customary work environment. Consequently, it is appropriate to speak of a "virtual home".

It should be clear however, that this invention is not limited to those implementation examples that have been explicitly described and, in particular, with reference to FIGS. 2 to 8.

In particular, as previously mentioned, those architectures, which implement inventive procedures and, more specifically, the partitioning and distribution of communication protocol layers between the host terminal and the smart card, may be diversified.

Similarly, examples of instruction and particular commands, as well as interface modes, have been provided for the sole purpose of better specifying the characteristics of this invention, without restricting applications in any way.

It should also be clear that, while particularly well adapted to applications termed securing (authentication, etc), the invention is not limited exclusively to these kinds of applications. Numerous applications may be stored in the smart card, with memory capacity of the latter, maximum data flow and the power of data processing circuits (microprocessor or microcontroller) functioning as the only limits. In fact, it should be observed that such limitations tend to lessen over time, since these depend on technological development, which particularly rapid in this domain.

Finally, the network, to which the terminal may be connected, are diverse (local network, Internet, etc.). The same applies to transmission protocols: Internet-type protocols, compatible with MINITEL (Copyrighted), etc. While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method of communication between a terminal and a smart card, said terminal being operatively connected to a smart card reader for communicating with the smart card and a data transmission network (RI), said terminal comprising a first network (RI) access protocol stack, comprising a specified number of communication software layers ($C_1$–$C_4$), and said smart card and smart card reader comprising a second protocol stack and a third protocol stack, each comprising at least lower order software communication layers ($CC_2$–$CC_1$, $CCa_2$–$CCa_1$), to allow data exchange between the smart card and said terminal, said method comprising establishing a first preliminary phase, an interface by a first specific software item in smart card for said lower order communication layers ($CCa_2$–$CCa_1$) of the third protocol stack with at least one application registered in the smart card, establishing a second preliminary phase, which consists of installing, in the terminal, a second specific software item, which functions as an interface with said lower order communication layers ($CC_2$–$CC_1$), of the second protocol stack and with specified layers of said first protocol stack ($C_2$, $C_3$), wherein said first and second specific software items in addition comprise at least one pair of primary coupled software entities, each of said entities cooperating with each other in order, and establishing a session for a bi-directional data exchange between at least one of said terminal and said smart card, and said data transmission network (RI), so that all or part of said data travels through said smart card.

2. The method of claim 1, wherein said specific software items comprise two additional entities consisting of a data transfer module, which functions as an interface for said lower layers ($CC_2$–$CC_1$, $CCa_2$–$CCa_1$) of the second and third protocol stacks and a management module, and in which said primary entities of each pair are constituted by intelligent agent software modules, establishing said sessions.

3. The method of claim 2, wherein said intelligent agents are clients, which open said data exchange sessions and servers, which supply said data.

4. The method of claim 2, wherein said intelligent agents are associated with at least one of the following attributes:

an initial attribute termed "host", indicating that the intelligent agent is located in said terminal;

a second attribute termed "card", indicating that the intelligent agent in located in said smart card;

a third attribute termed "local", indicating that the intelligent agent is not communicating with said network (RI);

a fourth attribute termed "network", indicating that the intelligent agent is communicating with said network (RI).

5. The method of claim 2, further comprising establishing a session between a pair of predetermined said agents, so as to send to said terminal data from an application, registered in said smart card, said data consisting of a list (P) of applications, after access is authorized by the user of the terminal.

6. The method of claim 5, wherein said network (RI) is a global network and said terminal comprises a navigator for said network, said data consisting of a page (P) written in hypertext language consisting of hyperlinks ($Hl_1$–$Hl_n$), pointing to resources located on various servers outside of terminal, further comprising utilizing said navigator for the selection of said hyperlinks ($Hl_i$) and generating a particular address, activating predetermined intelligent agents, and launching sessions for the exchange of data between the terminal and smart card and the terminal and said global network (RI), in order to reach a selected server, wherein all or part of said data traveling through said smart card.

7. The method of claim 5, wherein generating of the particular address of the said smart card by the network navigator occurs via a feedback address to said terminal.

8. The method of claim 6, further comprising the step of identifying said user and filtering data received and sent from and to said network (RI) using secret data located in said smart card, wherein said step of identifying and filtering occurs within smart card.

9. The method of claim 2, further comprising a step of establishing a data transfer session between a pair of said predetermined agents, to send to terminal data from an application, registered with said smart card, and configuring the terminal by said data according to a predetermined virtual model, so that said application may be executed from within terminal.

10. The method of claim 1, further including storing a plurality of applications in the smart card.

11. A method of communication between a terminal and a smart card, said terminal being operatively connected to a smart card reader for communicating with the smart cards and a data transmission network (RI), said terminal comprising a first network (RI) access protocol stack comprising a specified number of communication software layers (C1–C4), said smart card and smart card reader comprising a second protocol stack and a third protocol stack, each comprising at least lower order software communication layers (CC2–CC1, CCa2–CCa1), to allow for data exchange between the smart card and said terminal;

said method comprising establishing in a first preliminary phase an interface between a first specific software item and said lower order communication layers (CCa2–CCa1) of the third protocol stack which consists of installing, in the smart card, the first specific software item, which functions as an interface for said lower layers (CCa2–CCa1) of the third protocol stack and at least one application registered in the smart card;

establishing a second preliminary phase, which consists of installing, in the terminal, a second specific software item, which functions as an interface for said lower layers (CC2–CC1) of the second protocol stack and with specified layers of said initial protocol stack (C2, C3), wherein said first and second specific software items in addition comprise at least one pair of primary coupled software entities, each of said entities adapted to cooperate with each other, and;

establishing a bi-directional data exchange session between said terminal and said smart card, so that said smart card supplies said terminal with a pre-determined virtual terminal model, thereby transforming said smart card into at least one of a server and a client.

12. The method of claims 11, wherein at least one of said server and client is mobile and portable.

13. The method of claim 11, wherein said specific software items comprise two additional entities consisting of a data transfer module, which functions as an interface for said lower layers ($CC_2$–$CC_1$, $CCa_2$–$CCa_1$) of the second and third protocol stacks and a management module and in which said primary entities of each pair are constituted by intelligent agent software modules, establishing said sessions.

14. The method of claim 12, wherein said specific software items comprise two additional entities consisting of a data transfer module, which functions as an interface for said lower layers ($CC_2$–$CC_1$, $CCa_2$–$CCa_1$) of the second and third protocol stacks and a management module and in which said primary entities of each pair are constituted by intelligent agent software modules, establishing said sessions.

15. The method of claim 13, wherein said intelligent agents are clients, which open said data exchange sessions and servers, which supply said data.

16. The method of claim 14, wherein said intelligent agents are clients, which open said data exchange sessions and servers, which supply said data.

17. The method of claim 13, wherein said intelligent agents are associated with at least one of the following attributes:
   an initial attribute termed "host", indicating that the intelligent agent is located in said terminal;
   a second attribute termed "card", indicating that the intelligent agent in located in said smart card;
   a third attribute termed "local", indicating that the intelligent agent is not communicating with said network (RI);
   a fourth attribute termed "network", indicating that the intelligent agent is communicating with said network (RI).

18. The method of claim 14, wherein said intelligent agents are associated with at least one of the following attributes:
   an initial attribute termed "host", indicating that the intelligent agent is located in said terminal;
   second attribute termed "card", indicating that the intelligent agent in located in said smart card;
   a third attribute termed "local", indicating that the intelligent agent is not communicating with said network (RI);
   a fourth attribute termed "network", indicating that the intelligent agent is communicating with said network (RI).

19. The method of claim 13, further comprising establishing a session between a pair of predetermined said agents, so as to send to said terminal data from an application, registered in said smart card, said data consisting of a list (P) of applications, after access is authorized by the user of the terminal.

20. The method of claim 14, further comprising establishing a session between a pair of predetermined said agents, so as to send to said terminal data from an application, registered in said smart card, said data consisting of a list (P) of applications, after access is authorized by the user of the terminal.

21. The method of claim 13, further comprising a step of establishing a data transfer session between a pair of said predetermined agents, to send to terminal data from an application, registered with said smart card, and configuring the terminal by said data according to a predetermined virtual model, so that said application may be executed from within terminal.

22. The method of claim 14, further comprising a step of establishing a data transfer session between a pair of said predetermined agents, to send to terminal data from an application, registered with said smart card, and configuring the terminal by said data according to a predetermined virtual model, so that said application may be executed from within terminal.

23. The method of claim 11, further including storing a plurality of applications in the smart card.

24. A system of architecture for communication between a terminal, and a smart card comprising a smart card reader, a smart card communicating with the smart card, a smart card, a data transmission network (RI), said terminal having a first protocol stack for network (RI) access, said first stack comprising a determined number of communication software layers ($C_1$–$C_4$), said smart card comprising a second protocol layer and a third protocol layer, each comprising lower order communication software layers ($CC_2$–$CC_1$, $CCa_1$–$CCa_2$), for data exchange between the smart card and said terminal, and said smart card further comprising a first specific software item, which functions as an interface for said lower layers ($CCa_2$–$CCa_1$) of the third protocol stack and with at least one application registered in the smart card, terminal having a second specific software item, which functions as an interface with said lower layers ($CC_2$–$CC_1$) of the second protocol stack and with determined layers of the said first protocol stack ($C_2$, $C_3$), wherein said first and second specific software items are adapted to cooperate with each other, to allow for the establishment of a bi-directional data exchange session between at least one of said terminal and said smart card, and said network (RI), so that all or part of said data travels through said smart card.

25. The architecture of claim 24 further comprising communication circuits connected to said network (RI), said second specific software item, is located on a side of terminal between lower layers ($C_1$–$C_2$), contained in said communication circuits, and higher layers ($C_3$, $C_4$) of said first protocol stack, so that said terminal and said smart card can share the same address on network (RI), controlled by the second specific software item, on the side of the terminal.

26. The architecture of claim 25, wherein an additional physical device, is located between said network (RI) and said terminal, said additional physical device comprising first and second communication circuits, each consisting of two lower communication protocol layers ($C'_1$–$C'_2$, $C''_1$–$C''_2$), the first circuits being connected to network (RI) and the second circuits being connected to said communication circuits of the terminal, the additional physical device being connected to said reader of smart card, and said specific software item, on the side of the terminal, is located within said additional physical device, and functions as an interface between said lower layers ($C'_1$–$C'_2$, $C''_1$–$C''_2$) of said first and second communication circuits and lower layers ($CC_1$, $CC_1$) of reader of smart card, so that the terminal and smart card can share the same address on network (RI), while controlled by specific software item, on the side of the terminal.

27. The architecture of claim 26, wherein said communication circuits are connected to said network (RI), said specific software item, on the side of terminal, functions as an interface between said lower layers ($CC_1$, $CC_2$) of said second protocol stack and is located between layers at higher levels ($C_3$, $C_4$) of said first protocol stack, so that said smart card with an address that is different from terminal on network (RI), terminal functions for smart card as an access bridge to network (RI), while controlled by specific software item of terminal.

28. The architecture of claim 27, wherein said communication circuits are connected to said network (RI), wherein said specific software item on the side of terminal functions as an interface between said lower layers ($CC_1$, $CC_2$) of said second protocol stack and is located between one layer of said first protocol stack at a higher level 4 ($C_4$), and one application layer so that the flow of application-type data is authorized between said smart card and said terminal.

29. A system of architecture for communication between a terminal, and a smart card comprising a smart card reader for communication with the smart card, a data transmission network (RI), said terminal having a first protocol stack for network (RI) access, said first stack comprising a number of communication software layers ($C_1$–$C_4$), and said smart card reader, and said smart card having a second protocol stack and a third protocol stack, each comprising lower order software communication layers ($CC_2$–$CC_1$, $CCa_2$–$CCa_1$), for allowing data exchange between the smart card and said terminal, said smart card having a first specific software item, which functions as an interface with said lower layers ($CCa_2$–$CCa_1$) of the third protocol stack and with at least one application registered in the smart card, said terminal having a second specific software item, which functions as an interface with said lower layers ($CC_2$–$CC_1$) of the second protocol stack and with determined layers of the first protocol stack ($C_2$, $C_3$), wherein said first and second specific software items are adapted to cooperate with each other in order to establish a bi-directional data exchange session between said terminal and said smart card, whereby said smart card supplies said terminal with a predetermined terminal virtual model, which transforms said smart card into at least one of a server and a client.

30. The architecture of claim 29, wherein said server and/or client is both mobile and portable.

* * * * *